United States Patent [19]

Fadus

[11] Patent Number: 4,955,988
[45] Date of Patent: Sep. 11, 1990

[54] GAS SAFETY VENT DEVICE

[76] Inventor: Richard F. Fadus, 225 Crescent Cir., Cheshire, Conn. 06410

[21] Appl. No.: 42,048

[22] Filed: Apr. 24, 1987

[51] Int. Cl.⁵ ............................................. F17D 3/04
[52] U.S. Cl. .................................................. 48/193
[58] Field of Search .................. 48/193; 137/312, 363; 285/158, 177, 371, 373; 277/192, 199

[56] References Cited

U.S. PATENT DOCUMENTS

| | | | |
|---|---|---|---|
| 732,712 | 7/1903 | Claytor | 48/193 |
| 1,804,896 | 5/1931 | Sullivan | 48/193 |
| 2,108,840 | 2/1938 | Anthony | 48/193 |
| 2,871,113 | 1/1959 | Hammers | 48/193 |
| 3,338,254 | 8/1967 | Regal | 48/193 |
| 3,436,197 | 4/1969 | Borst et al. | 48/193 |
| 3,472,536 | 10/1969 | Ingram | 285/177 |
| 3,802,458 | 4/1974 | Wilmeth | 137/363 |
| 4,359,812 | 11/1982 | Haag et al. | 285/177 |
| 4,480,860 | 11/1984 | Foresta et al. | 285/177 |

*Primary Examiner*—Joye L. Woodard
*Attorney, Agent, or Firm*—CTC & Associates

[57] ABSTRACT

A gas safety vent device for application to a service pipe of predetermined outside diameter prevents leaking gas from seeping along the exterior of the pipe and entering a building by diverting the gas away from the pipe and venting the same to the atmosphere. The device has a chimney extending from a lower end to an upper end and a lower portion providing a chamber in communication with the chimney and oppositely facing gas sealing and gas entering faces. The gas sealing face surrounds the pipe in gas sealing relationship therewith. The gas entering face has an opening and wire mesh material in the opening has an outer periphery secured to the wall of the opening and an inner periphery defining an inner circle of a diameter substantially the same as the outside diameter of the pipe. The area of the wire mesh material is substantially greater than the area of the circle and the radial dimension of the wire mesh material is everywhere substantially greater than the radius of the circle. Seeping gas enters the chamber through the wire mesh material and exits the device through the chimney. The vent device is formed in pairs for direct installation on a pipe, and also includes an adapter sleeve formed in pairs for installation on a pipe of lesser outer diameter.

5 Claims, 3 Drawing Sheets

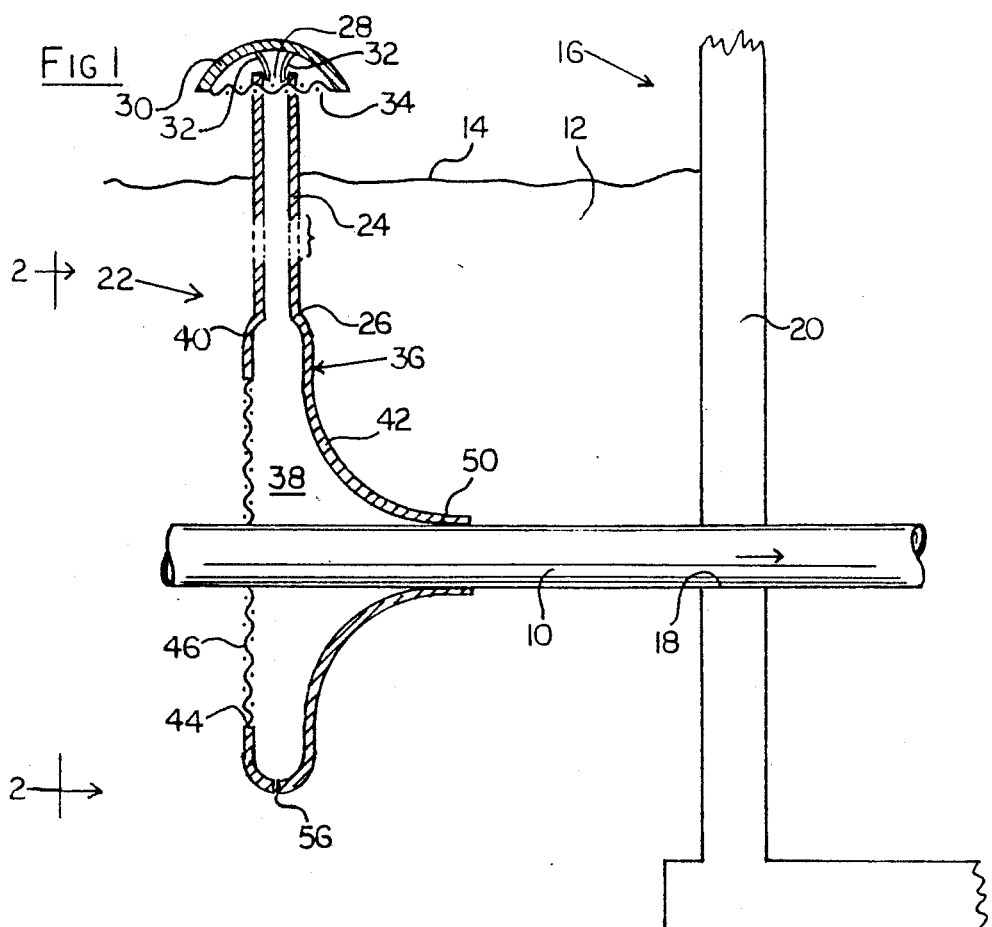
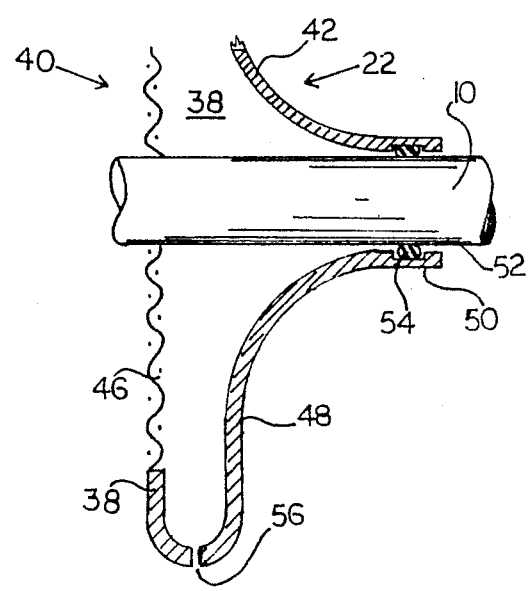

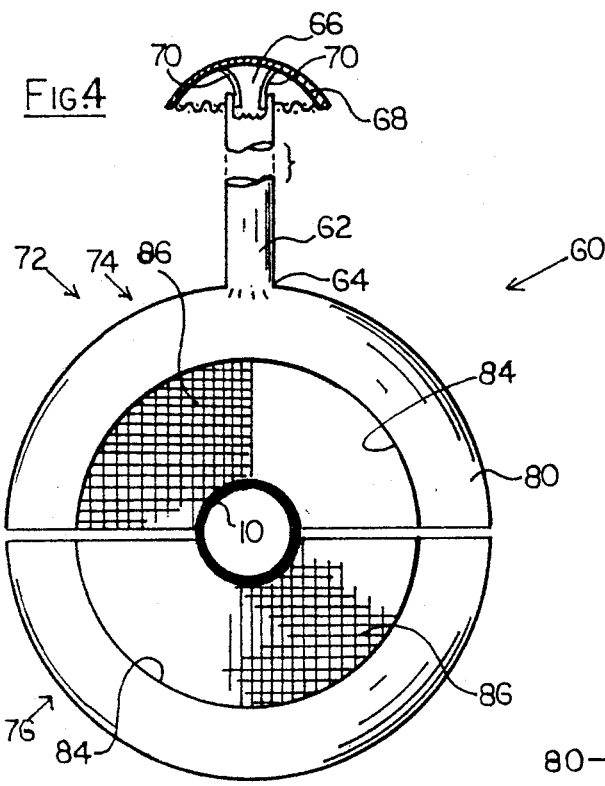
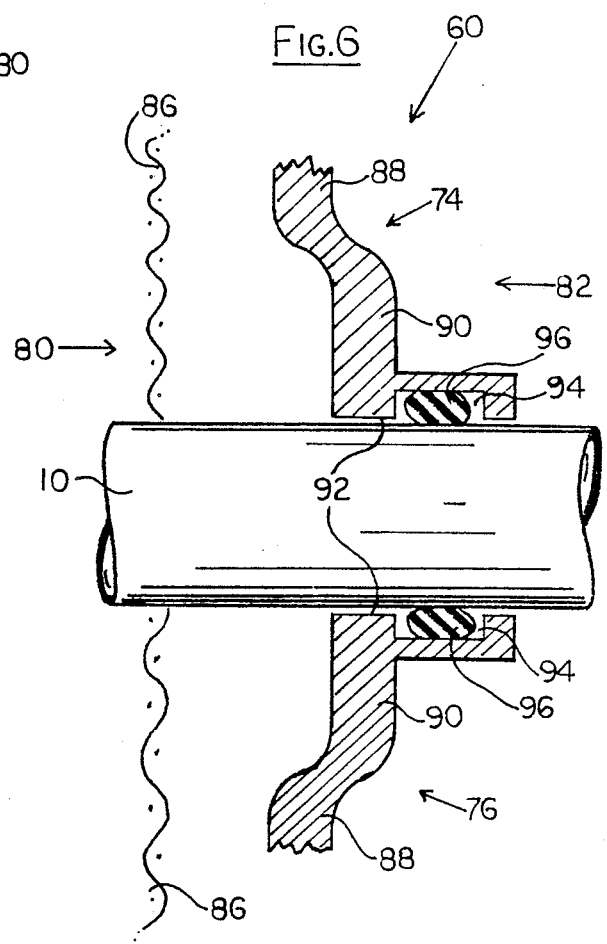
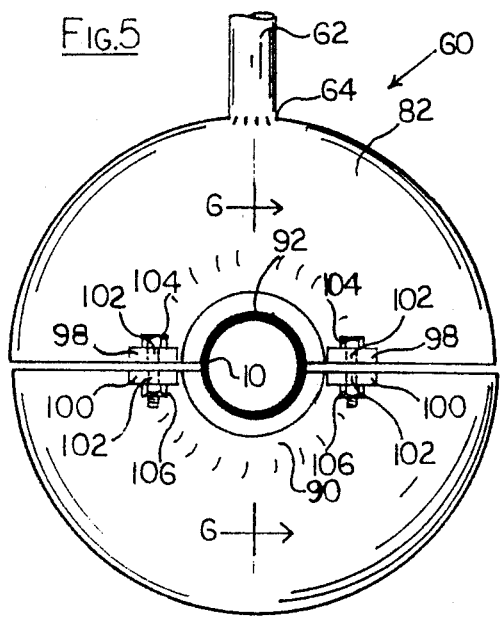

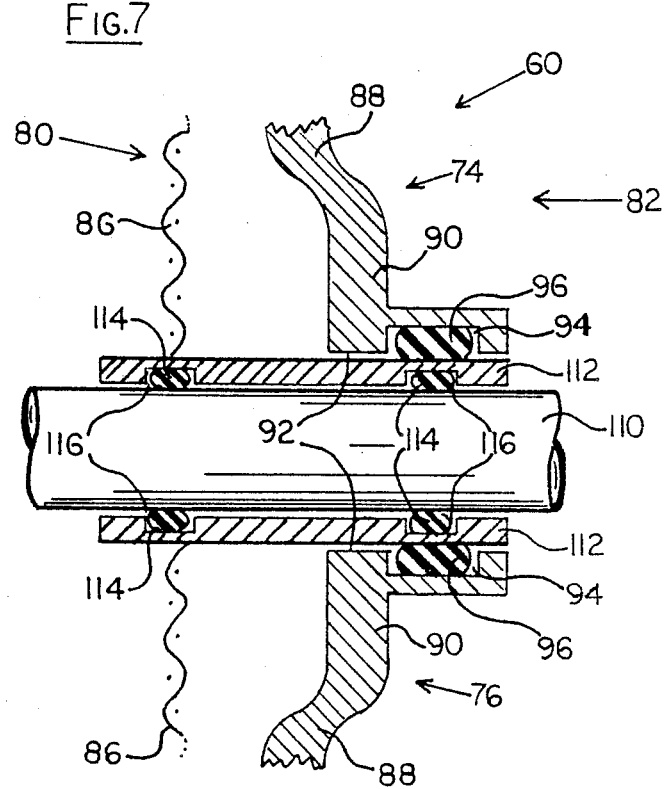

GAS SAFETY VENT DEVICE

BACKGROUND OF THE INVENTION

This invention relates to a gas safety vent device and more particularly to a device for capturing and venting gas seeping from a leaking gas line or other service pipe to above ground, thus to prevent the seeping gas from entering a building.

It is well known that gas seeping from a leaking gas line will follow the path of least resistance. Often, the path of least resistance is along the exterior of the leaking gas line itself, or even along some other building service pipe, such as a water pipe or a sewer line passing through the wall of a house or other building. Gas thereby finding its way into buildings has been known to cause disastrous explosions and fires.

The invention presents an improvement over that of Claytor U.S. Pat. No. 732,712 which issued July 7, 1903.

Other U.S. Patents that may be of interest as background information are the following:

| U.S. Pat. No. | Date | Inventor(s) |
|---|---|---|
| 2,871,113 | January 27, 1959 | Hammers |
| 3,338,254 | August 29, 1967 | Regal |
| 3,436,197 | April 1, 1969 | Borst et al. |
| 3,802,458 | April 9, 1974 | Wilmeth |

The Claytor patent discloses an escape gas receiver comprising a cylindrical casing perforated at each end, and an outwardly extending flange surrounding each perforation. A gas pipe passes through the perforations and enters a building. The flange remote from the building is funnel-shaped and a packing is arranged between the flange opposite the funnel-shaped flange and the gas pipe. The small diameter of the funnel-shaped flange is greater than the outside diameter of the gas pipe, and a gas escape pipe extends upwardly from the top of the cylindrical casing. Gas passing along the exterior of the gas pipe toward the building is led into the cylindrical casing through the funnel-shaped flange and is prevented from continuing along the gas pipe by the packing, instead being diverted away from the gas pipe through the gas escape pipe.

It is an important object of the invention to provide a gas safety vent device that is an improvement over the escape gas receiver of the Claytor patent in terms of construction, cost and effectiveness of operation.

Other objects and advantages will appear hereinafter.

SUMMARY OF THE INVENTION

A gas safety vent device embodying the invention is applied to a gas line or other service pipe of predetermined outside diameter that passes through the wall of a building, to prevent gas seeping from a leaking gas line from entering the building, the device providing means for diverting seeping gas away from the service pipe and venting the same harmlessly to the atmosphere.

The device includes a chimney extending from a lower end to an upper end and a chamber in open communication with the lower end of the chimney. The chamber has oppositely facing aligned gas entering and gas sealing faces, the gas entering face facing away from the building when the device is installed on the service pipe. The gas sealing face surrounds the pipe and is in gas sealing relationship therewith.

The gas entering face has an opening and wire mesh material in the opening has an outer peripehry secured to the wall of the opening and an inner periphery defining an inner circle of a diameter substantially the same as the outside diameter of the pipe. The area of the wire mesh material is substantially greater than the area of the circle and the radial dimension of the wire mesh material is everywhere substantially greater than the radius of the circle.

Seeping gas enters the chamber through the wire mesh material and thereupon enters the chimney through the lower end thereof and exits the device through the upper end of the chimney.

DESCRIPTION OF THE DRAWING

FIG. 1 is a view showing in axial section a gas safety vent device that is first preferred embodiment of the invention installed on a service pipe that is buried in the ground and that enters a building through a concrete foundation wall;

FIG. 2 is a view on line 2—2 of FIG. 1, showing the face of the gas safety vent device facing away from the building;

FIG. 3 is an enlarged fragmentary view of a portion of what is shown in FIG. 1;

FIGS. 4 and 5 are views of opposite faces of a gas safety vent device that is a second preferred embodiment of the invention, shown installed on a service pipe, FIG. 4 showing the face of the device facing away from a building and FIG. 5 showing the face of the vent facing the building;

FIG. 6 is a fragmentary enlarged view on line 6—6 of FIG. 5; and

FIG. 7 is a view similar to FIG. 6 but showing the second preferred embodiment applied to a service pipe of smaller outside diameter than the pipe of FIG. 6.

DESCRIPTION OF THE INVENTION

FIG. 1 shows a cylindrical gas pipe or other service pipe 10 of predetermined outside diameter buried in ground 12 beneath grade level 14 and entering a building indicated generally at 16 through a service opening 18 through a concrete foundation wall 20. Gas pipe 10 conducts gas into building 16 in the direction indicated by the arrow in FIG. 1. In the event a leak develops in gas pipe 10 or a line feeding gas pipe 10, leaking gas will follow the path of least resistance, often along the exterior of gas pipe 10. Since service opening 18 is not necessarily air tight, unless some gas diverting means is provided for preventing it, leaking gas can find its way into building 16 between service opening 18 and pipe 10, with possible disastrous results in terms of explosion and fire, or asphyxiation of occupants of building 16.

FIGS. 1, 2 and 3 also show, somewhat schematically, such a gas diverting means provided by a gas safety vent device 22 that is a first preferred embodiment of the invention. Device 22 includes a cylindrical chimney 24 extending vertically from a lower end 26 below grade level 14 to an upper open end 28 above grade level 14. A downwardly concave cap 30 is coaxial with chimney 24 and covers and is spaced from upper end 28 and is held in place by suitable supports 32. As shown, cap 30 is provided with a screen 34 to prevent insects and the like from clogging upper end 28.

Device 22 further includes a lower portion 36 attached to chimney 24 and providing a chamber 38 in open communication with lower end 26 of chimney 24.

Chamber 38 has a gas entering face 40 and a gas sealing face 42.

Gas entering face 40 has a circumferentially continuous circular opening 44 of diameter substantially larger than the outside diameter of pipe 10. Opening 44 contains a piece of non-corrosive mesh material 46, of a mesh size to allow gas to pass therethrough to enter chamber 38 but to keep earth back fill out of chamber 38. The outer periphery of mesh 46 is circular and suitably secured to the wall of opening 44, and the inner periphery of mesh 46 is also circular and circumferentially continuous and concentric with the outer periphery thereof and of diameter equal to or marginally greater than the outside diameter of pipe 10. As shown, the ratio of the diameter of opening 44 to the diameter of the inner periphery of mesh 46 is about 5 to 1 and the ratio of the area of opening 44 to the area of the circle defined by the inner periphery of mesh 46 is about 25 to 1.

Gas sealing face 42 has an imperforate wall 48 spaced from mesh material 46 and a central boss 50 having an internal cylindrical circumferentially continuous surface 52 (FIG. 3) coaxial with opening 44 and of diameter equal to or slightly greater than the outside diameter of pipe 10. Surface 52 has gas sealing means. As shown, the gas sealing means is provided by a circumferential internal groove in surface 52 and a circumfrentially continuous gas sealing resilient O-ring 54 seated in the groove.

A water drainage hole 56 is shown through the wall of device 22 at the bottom of chamber 38.

Gas safety vent device 22 is installed on gas pipe 10 by passing device 22 over an end of a secton of pipe 10 in close proximity to building 16 with face 42 confronting building 16 and with chimney 24 extending generally vertically upward from pipe 10, so that upper end 28 is above grade level 14. In the installed condition, pipe 10 passes through mesh 46 in engagement with the inner periphery thereof or just barely spaced therefrom and also through boss 50, with O-ring 54 in gas sealing engagement with pipe 10 and with the groove.

Thereafter, any leaking gas seeping along the exterior of pipe 10 will enter chamber 38 through mesh material 46 and pass upwardly through lower end 26 of chimney 24, upwardly through chimney 24 before exiting from upper end 28 of chimney 24 harmlessly to the atmosphere. Further seepage of gas along the exterior of pipe 10 past device 22 will be prevented by O-ring 54.

Device 22 provides a simple means for preventing leaking gas seeping along the exterior of gas pipe 10, or other building service pipe, from entering a building, and venting such leaking gas harmlessly to the atmosphere.

Device 22 is of particular utility for installation on pipe 10 at the same time as pipe 10 is installed, but is impractical to install later on since sections of pipe 10 would have to be removed and replaced.

FIGS. 4, 5 and 6 show a gas safety vent device, indicated generally at 60, that is a second preferred embodiment of the invention. Device 60 is shown installed on pipe 10 and can be so installed with equal facility at the time pipe 10 is installed or at a later time. As before, pipe 10 conducts gas into a building in the direction of the arrow in FIG. 6.

Device 60, like device 22, is a gas diverting means. Device 60 includes a cylindrical chimney 62 extending from a lower end 64 to an upper open end 66. A downwardly concave cap 68 is coaxial with chimney 62 and covers and is spaced from upper end 66 and is held in place by suitable supports 70. Cap 68 is shown as provided with a screen 72 to prevent insects and the like from clogging upper end 66.

Device 60 further includes a lower portion 72 comprising an upper member 74 integrally attached to chimney 62 and a lower member 76, members 74 and 76 being substantially mirror images of each other. Upper and lower members 74 and 76 are each about 180 degrees in circumferential extent and cooperate, when assembled together and with pipe 10 as shown and as described below, to provide a chamber 78 (FIG. 6) in open communication with lower end 64 of chimney 62. Chamber 78 has a gas entering face 80 (FIGS. 4 and 6) and a gas sealing face 82 (FIGS. 5 and 6), each provided equally by upper and lower members 74 and 76.

Gas entering face 80 has a circular opening 84 provided equally by upper and lower members 74 and 76, the diameter of opening 84 being several times the outside diameter of pipe 10. Opening 84 contains two substantially semi-circular pieces of mesh material 86, the outer periphery of one of which is suitably secured to the portion of opening 84 provided by upper member 74 and the other of which is suitably secured to the portion of opening 84 provided by lower member 76. The inner peripheries of pieces of material 86 are also semi-circular and concentric with the outer peripheries thereof and of diameter equal to or marginally greater than the outside diameter of pipe 10. As shown, the ratio of the diameter of opening 84 to the diameter of the inner peripheries of pieces of material 86 is about 4.8 to 1 and the ratio of the area of opening 84 to area of the circle defined by the inner peripheries of pieces of material 86 is about 23 to 1.

Gas sealing face 82 is, as stated, provided equally by upper and lower members 74 and 76. Members 74 and 76 cooperate to provide an imperforate wall 88 spaced from mesh material 86 and a central boss 90 having an internal cylindrical surface 92 coaxial with opening 84 and of diameter equal to or slightly greater than the outside diameter of pipe 10.

Internal surface 92 is provided with gas sealing means, in the form of a groove 94, equal portions of which are in upper member 74 and lower member 76. The gas sealing means further comprises two semi-circular gas sealing resilient O-ring halves 96 shown in FIG. 6 seated in groove 94 and in gas sealing engagement with pipe 10.

Upper member 74 is provided with diametrically opposite lugs 98 protruding from the portion of boss 90 provided by upper member 74 and lower member 76 is provided with diametrically opposite lugs 100 protruding from the portion of boss 90 provided by lower member 76. Lugs 98 and 100 have bolt clearance holes 102 therethrough.

To install device 60 at a desired location on pipe 10, one inserts one O-ring half 96 in each groove 94 on pipe 10 at the desired location with chimney 62 projecting upwardly, and clamps members 74 and 76 together by bolts 104 of plastic material such as nylon passing through clearance holes 102 and turning nuts 106 of plastic material such as nylon into threaded engagement with bolts 104, thus clamping lugs 98 and 100 together between nuts 106 and the heads of bolts 104. This will compress O-ring halves 96 into gas sealing engagement with pipe 10 and will bring the inner peripheries of pieces of material 86 into engagement with, or into close proximity to, pipe 10. The operation of device 60 is the same as the operation of device 22.

It is to be borne in mind that the utility of devices 22 and 60 is not limited to their application to gas pipes, since leaking gas can find its way into buildings by seeping along other service pipes as well.

Further, it is not necessary that openings 44 and 84 be circular, the important consideration in this regard being that the area of pieces of mesh material 46 and 86, which serve to guide seeping gas into chambers 38 and 78, respectively, be substantially greater than the cross sectional area of the exterior of pipe 10, i.e., the area of the circle defined by the inner periphery of the mesh material, and that the radial dimension of the mesh material be everywhere substantially greater than the radius of the inner periphery of the mesh material. In the disclosed examples, this area ratio is on the order of 23 or 25 to 1.

As used herein, the term "effective outside diameter" of a pipe means its actual outside diameter or its outside diameter as enhanced by adapter means to a diameter larger than its actual outside diameter. The service pipes to which devices in accordance with the invention may be applied may have different outside diameters, for example, 6 inches (15.2 cm) or 10 inches (25.4 cm). Gas safety vent device 60 need not be supplied in two different sizes to be useful with these (or other) outside pipe diameters. Assume that pipe 10 as depicted in FIGS. 4, 5 and 6 has an outside diameter of 10 inches (25.4 cm). FIG. 7 depicts device 60 applied to a pipe 110 having an outside diameter of 6 inches (15.2 cm). This is accomplished by interposing between device 60 and pipe 110 an adapter means in the form of a pair of identical semi-cylindrical bushing type sleeve halves 112 having a nominal outside diameter of ten inches (25.4 cm) to conform to device 60 and a nominal inside diameter of 6 inches (15.2 cm) to conform to pipe 110. Sleeve halves 112, which are provided with internal circumferential grooves 116 each containing an O-ring half 114 for effecting a gas seal with pipe 110, traverse pieces of mesh material 86 and extend past groove 94 and O-ring halves 96 produce a gas seal with the outside of sleeve halves 112. By virtue of sleeve halves 112, pipe 110 has an effective outside diameter of ten inches (25.4 cm).

The invention well attains the stated objects and advantages and others.

The disclosed details are exemplary only and are not to be taken as limitations on the invention except as those details may be included in the appended claims.

What is claimed is:

1. A gas safety means kit having component parts capable of being assembled in the field in surrounding relationship with a pipe to prevent leaking gas from seeping along the exterior of the pipe and entering a building by venting the gas to the atmosphere, the pipe having an outside diameter of a greater magnitude or a lesser magnitude, said component parts comprising the commbination of a gas safety vent device and adapter means, said gas safety vent device including an upper member, a chimney integral with said upper member, and a lower member joinable to said upper member with the pipe passing therebetween, each of said upper and lower members having a first internal cylindrical surface of about 180 degrees in arcuate extent and a second internal cylindrical surface of about 180 degrees in arcuate extent, said first and second cylindrical surfaces of said upper member being coaxial and said first and second cylindrical surfaces of said lower member being coaxial, said first surfaces being of equal diameter about the same as the diameter of greater magnitude and said second surfaces being of equal diameter substantially larger than the diameter of said first surfaces, said first and second surfaces of said upper and lower members being equally spaced from each other, and a first piece of wire mesh material having an outer periphery attached to said second surface of said upper member and an inner cylindrical periphery of about 180 degrees in arcuate extent and spaced a predetermined distance from and coaxial with and of the same diameter as said first internal cylindrical surface of said upper member, and a second piece of wire mesh material having an outer periphery attached to said second surface of said lower member and an inner cylindrical periphery of about 180 degrees in arcuate extent and spaced said predetermined distance from and coaxial with and of the same diameter as said first internal cylindrical surface of said lower member, and said adapter means including a pair of identical semi-cylindrical sleeve halves each having an outside diameter adapted to lie within and conform to said first internal cylindrical surfaces of said upper and lower members and to lie within and conform to said inner cylindrical peripheries of said pieces of wire mesh material and an inside diameter substantially the same as the pipe diameter of lesser magnitude, whereby said upper and lower members are installable directly on a pipe of diameter of said greater magnitude, or are installable on a pipe of diameter of said lesser magnitude with said adapter means interposed between said members and said pipe of diameter of said lesser magnitude, in either case to form a chamber for collecting seeping gas and venting same to the atmosphere through said chimney.

2. The invention of claim 1 wherein said lower member and said upper member are joinable by clamping.

3. The invention of claim 1 further including sealing means for sealing said upper and lower members to an external cylindrical surface within said first internal cylindrical surfaces of said upper and lower members.

4. The invention of claim 3 further including sealing means for sealing said sleeve halves to a pipe of diameter of said lesser magnitude therewithin.

5. The invention of claim 1 wherein the diameter of said second surfaces of said upper and lower members is at least several times the diameter of said first surfaces of said upper and lower members.

* * * * *